(12) United States Patent
Niwano et al.

(10) Patent No.: US 8,699,331 B2
(45) Date of Patent: *Apr. 15, 2014

(54) COMMUNICATIONS SYSTEM, COMMUNICATIONS APPARATUS, COMMUNICATIONS TERMINAL AND COMMUNICATIONS METHOD

(75) Inventors: Kazuhito Niwano, Tokyo (JP); Hideji Wakabayashi, Tokyo (JP); Koutarou Sugisawa, Tokyo (JP)

(73) Assignee: BlackBerry Limited, Waterloo, Ontario (CA)

( * ) Notice: Subject to any disclaimer, the term of this patent is extended or adjusted under 35 U.S.C. 154(b) by 774 days.

This patent is subject to a terminal disclaimer.

(21) Appl. No.: 12/197,884

(22) Filed: Aug. 25, 2008

(65) Prior Publication Data

US 2008/0318586 A1    Dec. 25, 2008

Related U.S. Application Data

(63) Continuation of application No. 11/203,135, filed on Aug. 15, 2005, now abandoned, which is a continuation of application No. PCT/JP2004/001530, filed on Feb. 13, 2004.

(51) Int. Cl.
*G01R 31/08* (2006.01)

(52) U.S. Cl.
USPC ............ 370/230; 370/236; 370/329; 370/437

(58) Field of Classification Search
None
See application file for complete search history.

(56) References Cited

U.S. PATENT DOCUMENTS 7,177,658 B2 * 2/2007 Willenegger et al. .......... 455/522
7,352,698 B2 * 4/2008 Niwano et al. ................ 370/230

(Continued)

FOREIGN PATENT DOCUMENTS

JP    11-113064    4/1999
JP    2000-004192  1/2000

(Continued)

OTHER PUBLICATIONS

"Universal Mobile Telecommunications System (UMTS); Multicall; Service description; Stage 1 (3GPP TS 22.135 version 4.2.0 Release 4), ETSI TS 122 135 v4.2.0", Technical Specification, vol. 3-SA1, No. V420, XP-014007330, Dec. 2002, pp. 1-20.

(Continued)

*Primary Examiner* — Michael J Moore, Jr.
(74) *Attorney, Agent, or Firm* — Finnegan, Henderson, Farabow, Garrett & Dunner, LLP

(57) ABSTRACT

According to a communications method according to the present invention, data is transmitted from a base station to two or more terminals via a common channel, and transmission power, with which the data is transmitted from the base station to the two or more terminals, is controlled according to a reception state of at least one of the two or more terminals. Furthermore, the terminal transmits reception capability information at a time of selection combining, and at least one of the two or more base stations receives the reception capability information at the time of selective combining and notifies the reception capability information to a radio network controller (RNC) which controls the two or more base stations. When a connection request is issued to the terminal, the RNC refuses assignment of a dedicated channel to the connection request when determining that the assignment of the dedicated channel to the terminal cannot be done based on the reception capability information at the time of selective combining.

2 Claims, 12 Drawing Sheets

(56) References Cited

U.S. PATENT DOCUMENTS

| | | | |
|---|---|---|---|
| 8,451,770 B2* | 5/2013 | Chen et al. | 370/321 |
| 2001/0026538 A1 | 10/2001 | Bruss | |
| 2003/0012217 A1 | 1/2003 | Andersson et al. | |
| 2003/0054799 A1 | 3/2003 | Shin | |
| 2003/0207696 A1 | 11/2003 | Willenegger et al. | |
| 2004/0146041 A1* | 7/2004 | Lee et al. | 370/349 |
| 2004/0147266 A1* | 7/2004 | Hwang et al. | 455/445 |
| 2004/0184438 A1* | 9/2004 | Terry | 370/349 |
| 2004/0185837 A1 | 9/2004 | Kim et al. | |
| 2006/0083191 A1 | 4/2006 | Niwano et al. | |

FOREIGN PATENT DOCUMENTS

| | | |
|---|---|---|
| JP | 2000-196776 | 7/2000 |
| JP | 2000-224648 | 8/2000 |
| JP | 2002-158618 | 5/2002 |
| JP | 2002-374571 | 12/2002 |
| JP | 2003-110500 | 4/2003 |
| JP | 2003-188818 | 7/2003 |
| JP | 2003-274437 | 9/2003 |
| JP | 2005-525032 | 8/2005 |
| JP | 3866275 B2 | 1/2007 |
| WO | WO 01/89096 A2 | 11/2001 |
| WO | WO 03/101141 A1 | 12/2003 |
| WO | WO 2004/071125 A2 | 8/2004 |

OTHER PUBLICATIONS

"Consideration on UE reception of MBMS simulcast transmission", NTT DoCoMo, TSG-RAN Working Group 1#33, New York City, New York, U.S.A., Aug. 25-29, 2003, (R1-030842:DoCoMo).

"3$^{rd}$ Generation Partnership Project: Technical Specification Group Radio Access Network; UE Radio Access capabilities (Release 5)", 3GPP TS 25.306 V5.7.0 (Dec. 2003) Technical Specification, pp. 1-29.

3GPP. "3$^{rd}$ Generation Partnership Project: Technical Specification Group Radio Access Network; Introduction to Multimedia Broadcast Multicast Service (MBMS) in the Radio Access Network (State 2); (Release 6) 3GPP TS 25:346 V2.5.0" to 3$^{rd}$ Generation Partnership Project ("3GPP"). Jan. 2004. pp. 1-39.

NTT DoCoMo, "Selective Combining for MBMS". TSG-ram Working Group #32. R1-031103. Oct. 6-10, 2003, pp. 1-8.

U.S. Appl. No. 13/175,584, filed Jul. 1, 2011, Wakabayashi.

* cited by examiner

FIG.8

| Reference combination of UE Radio Access capability parameters common for UL and DL | 12 kbps class | 32 kbps class | 64 kbps class | 128 kbps class | 384 kbps class | 768 kbps class | 2048 kbps class |
|---|---|---|---|---|---|---|---|
| Maximum number of S-CCPCH radio links for MBMS selective combining | 0 | 0 | 1 | 1 | 2 | 2 | 3 |
| Simultaneous reception of SCCPCH and DPCH during MBMS selective combining | No | No | Yes/No | Yes/No | Yes/No | Yes/No | Yes |
| Priority of DPCH to MBMS selective combining | No | No | Yes/No | Yes/No | Yes/No | Yes/No | Yes/No |

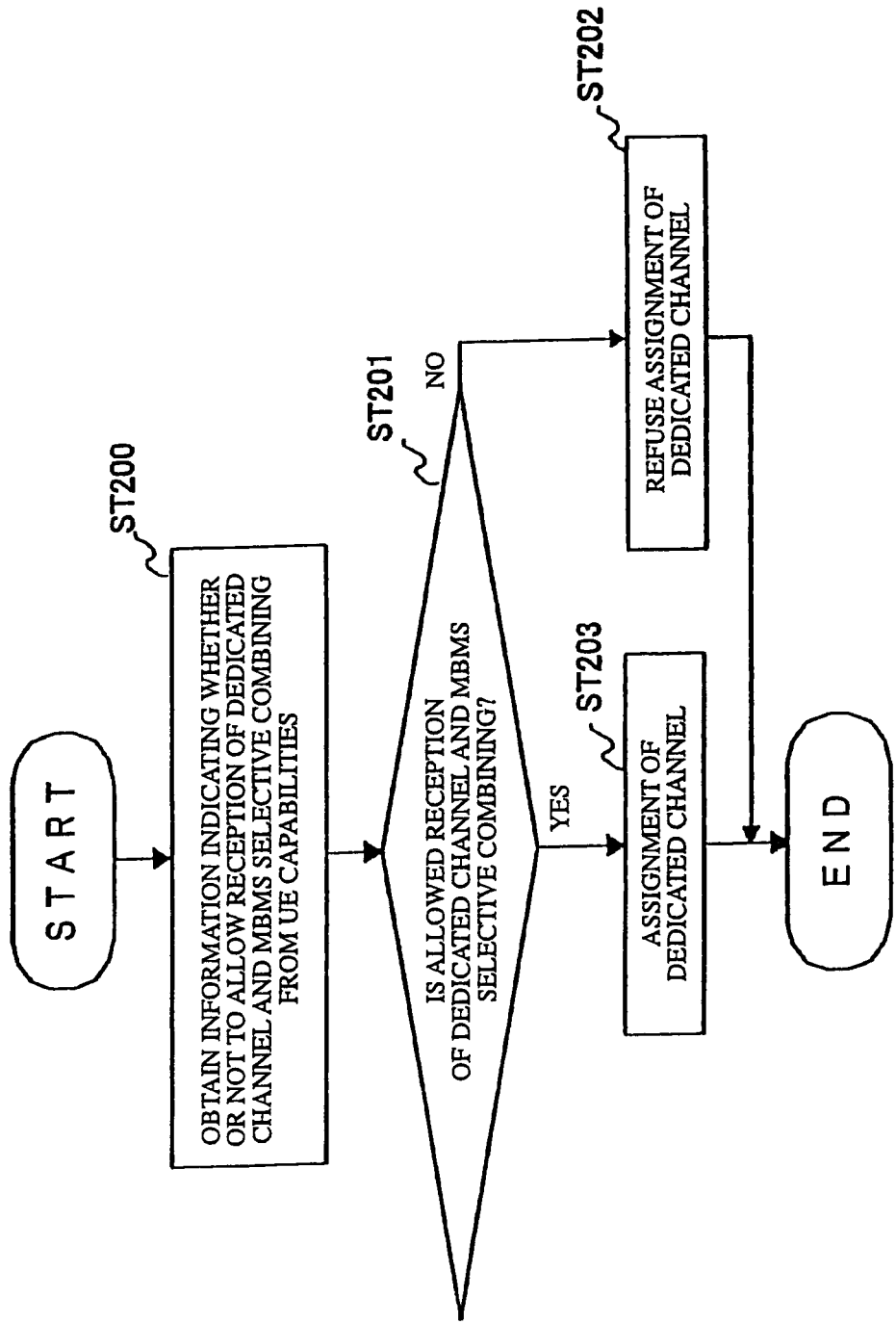

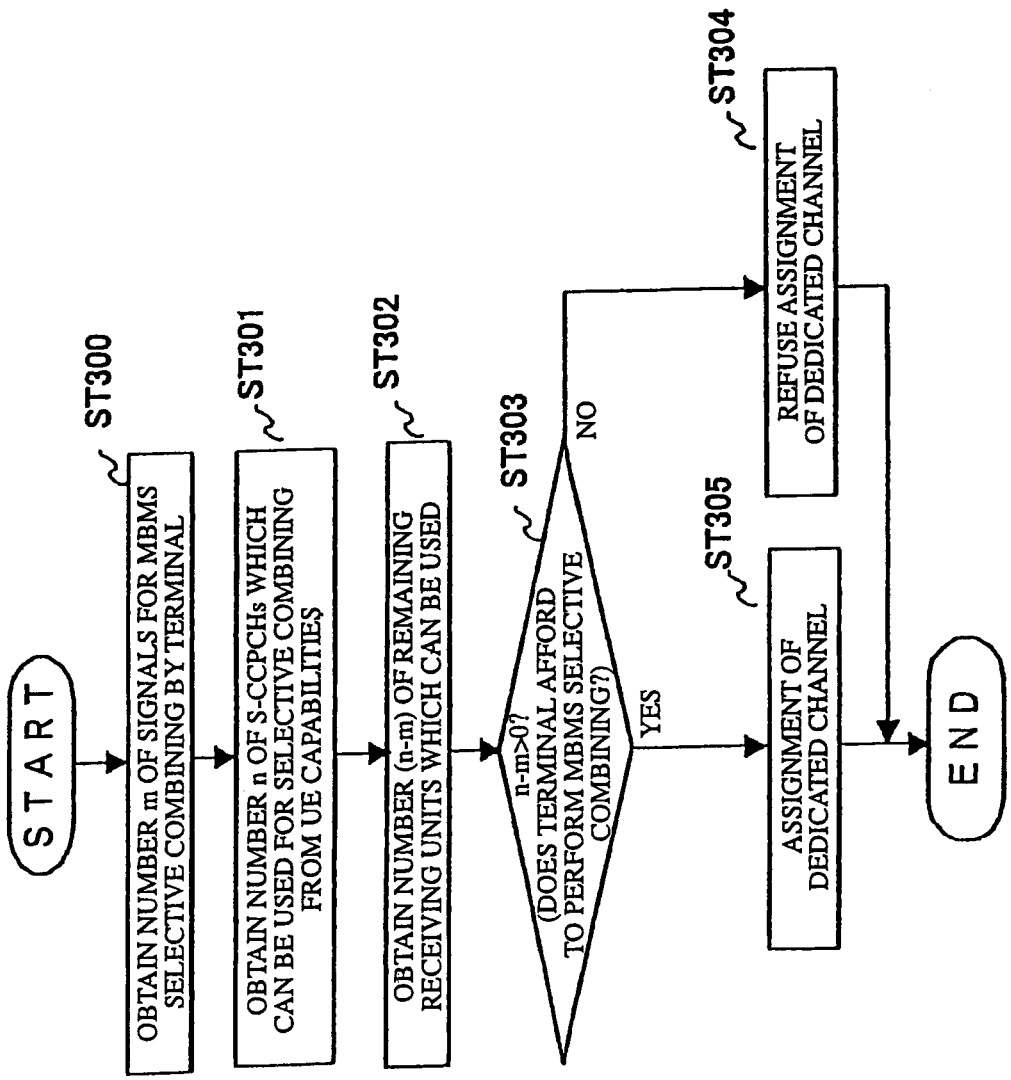

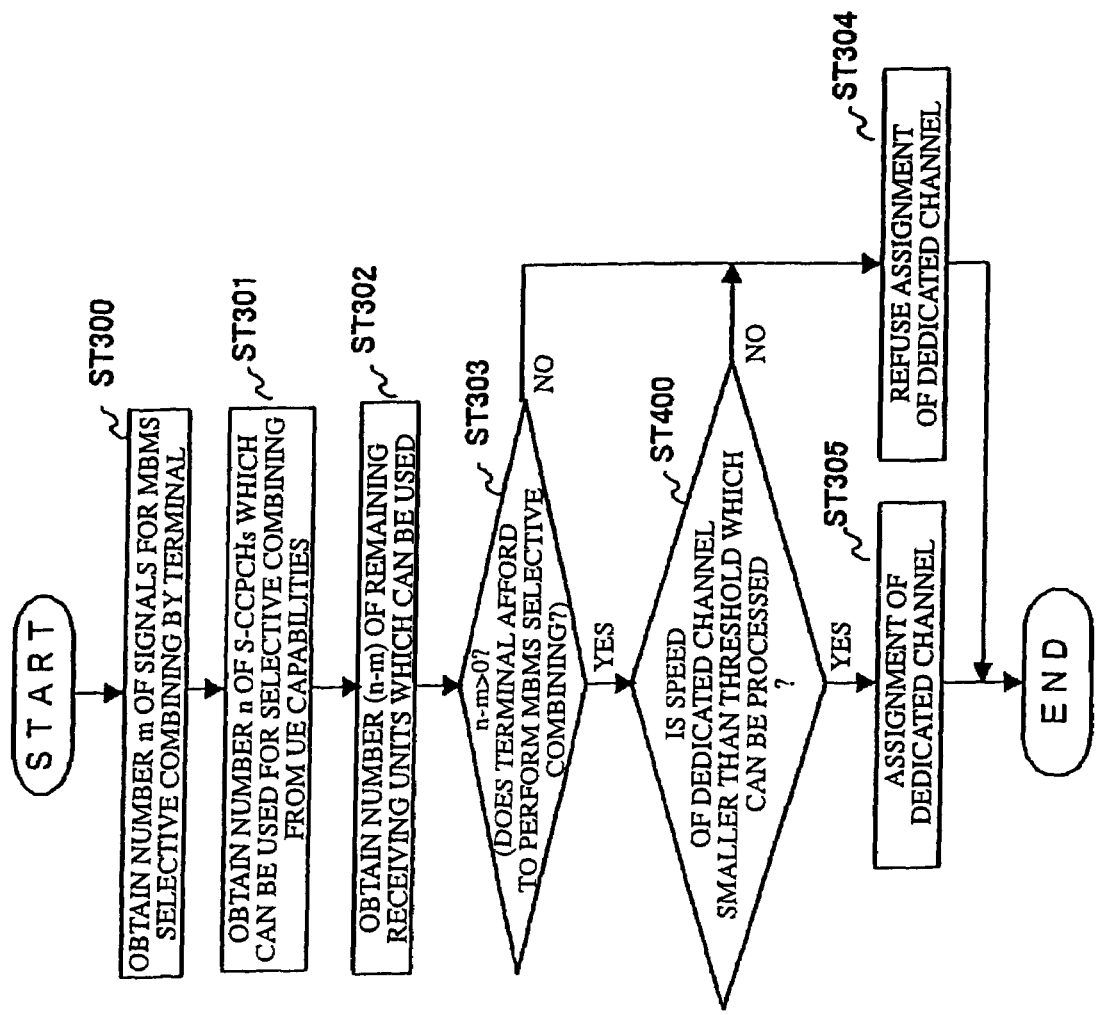

COMMUNICATIONS SYSTEM, COMMUNICATIONS APPARATUS, COMMUNICATIONS TERMINAL AND COMMUNICATIONS METHOD

CROSS REFERENCE TO RELATED PATENT AND APPLICATION

This application is a Continuation of U.S. Ser. No. 11/203,135, filed Aug. 15, 2005, which is a Continuation Application of PCT Application No. PCT/JP04/01530 filed Feb. 13, 2004, the entire contents of which are incorporated herein by reference.

FIELD OF THE INVENTION

The present invention relates to a communications system, a communications apparatus, a communications terminal, and a communications method suitable for broadcast or multicast communications services in mobile communications.

BACKGROUND OF THE INVENTION

A related art mobile phone system is predicated on a one-to-one correspondence relationship between base station and terminal, and any service for transmitting data simultaneously to two or more terminals by base stations is not expected. Conventionally, there has been provided a method of notifying information to terminals placed in a cell all at once using a common channel which is called broadcast channel. This method is for notifying control information to terminals, but is not for providing high-speed communications for users.

In recent years, multimedia services are expected as mobile communications services. Especially, there has been a growing interest in a technology for delivering multimedia information, such as a sportscast, a weather report, a radio broadcast, simultaneously to two or more users. Conventionally, there has been a necessity to provide required radio resources securely for every terminal for provision of information via one-to-one communications. A broadcast multimedia service is aimed at delivering one transmission information simultaneously to two or more users in order to save radio resources so that two or more users can receive data provided by this service and transmitted from a base station simultaneously using a common channel. In particular, this technology is called MBMS (Multimedia Broadcast Multicast Service) in 3GPP (3rd Generation Partnership Project).

The challenge to such a related art multimedia service is to guarantee the reception quality of a terminal which is staying in a cell's edge where the power of the received signal is weak. A method of securing the reception quality of a terminal by performing transmission power control is disclosed, as a solution to the challenge, by JP,2003-188818,A. According to this method, the transmission power of a base station is controlled so that the reception quality of even a terminal received minimum reception power that is staying in a cell's edge can be guaranteed. A problem with the related art method is however that since the transmission power is increased for a channel which does not have any function of performing transmission power control originally, the operation of controlling the transmission power is complicated, and since the transmission power is controlled according to the minimum reception power of a terminal which is staying in a cell's edge, the transmission power becomes large easily.

In addition, there is a method of selective combining which is different from soft combining. According to this selective combining method, a terminal receives signals simultaneously from two or more base stations and selects one of the signals having the best quality. The method is excellent because it makes it possible to store data even if there is a delay which exceeds the window size of the terminal. However, since the terminal needs to receive a number of channels for selective combining which corresponds to the number of signals subjected to the selective combining according to this selective combining method, the terminal needs many receiving circuits and therefore the hardware scale of the terminal becomes large. Therefore, when a terminal having a small number of receiving circuits receives an incoming call via a new dedicated channel during selective combining, the terminal has to give up the selective combining and to continue receiving MBMS data using only a channel from one base station. Then, since the reception quality of the terminal degrades rapidly, the base station cannot but raise its transmission power. As a result, a big problem is that since power assigned to other terminals, such as dedicated channels to other terminals, decreases, the capacity of the base station is also reduced.

DISCLOSURE OF THE INVENTION

It is an object of the present invention to provide a communications system, a communications apparatus, a communications terminal, and a communications method which can control new setup of a dedicated channel appropriately when a terminal is carrying out selective combining, thereby improving the capacity of the whole of the system.

A communications method in accordance with the present invention includes the step of transmitting data from a base station to two or more terminals via a common channel, and controlling transmission power, with which the data is transmitted from the base station to the two or more terminals, according to a reception state of at least one of the two or more terminals. Furthermore, the terminal transmits reception capability information at a time of selection combining, and at least one of the plurality of base stations receiving the reception capability information at the time of selective combining, and notifies the reception capability information to a Radio Network Controller (RNC) which controls the two or more base stations. When a connection request is then issued to the terminal, the RNC refuses assignment of a dedicated channel to the connection request if determining that the assignment of the dedicated channel to the terminal cannot be done based on the reception capability information at the time of selective combining.

BRIEF DESCRIPTION OF THE FIGURES

FIG. 8 is a diagram showing an example of UE Capabilities during MBMS selective combining in the system in accordance with embodiment 1 of the present invention;

FIG. 9 is a flow chart showing a process of determining whether or not to use a dedicated channel based on UE Capabilities which is carried out during MBMS selective combining in the system in accordance with embodiment 1 of the present invention;

FIG. 10 is a flow chart showing a process of determining whether or not to use a dedicated channel based on whether or not there is an available receiving unit which is carried out during utilization of MBMS in the system in accordance with embodiment 1 of the present invention;

FIG. 11 is a flow chart showing a process of determining whether or not to use a dedicated channel based on the type (i.e., a communication speed) of the dedicated channel which is carried out in the system in accordance with embodiment 3 of the present invention.

PREFERRED EMBODIMENTS OF THE INVENTION

Embodiment 1

System Configuration

Figure 1:
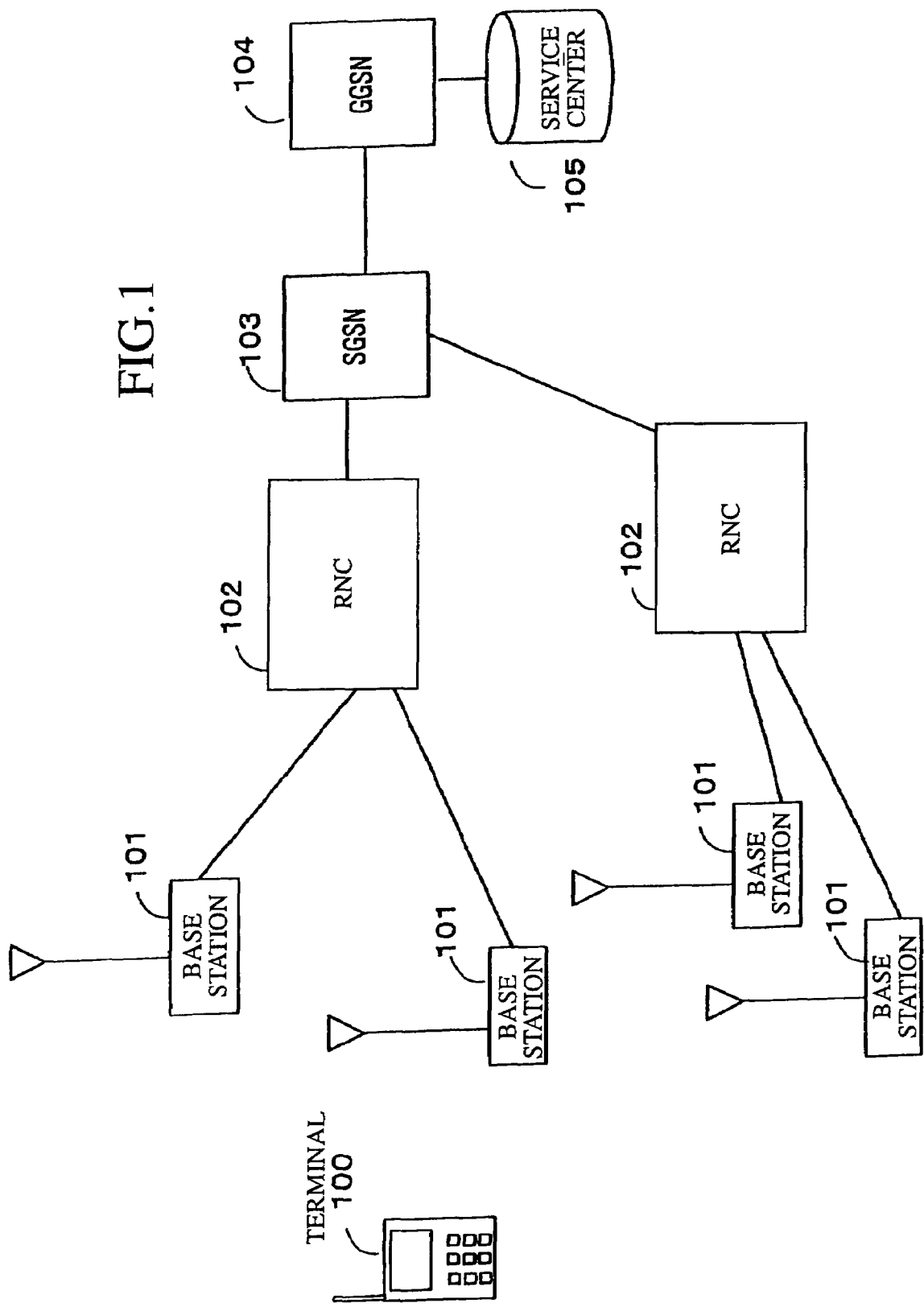
FIG. 1 is a diagram showing the structure of a W-CDMA system in accordance with any one of embodiments 1 to 4 of the present invention.

FIG. 1 is a system configuration diagram of a multimedia communications system in accordance with embodiment 1. A terminal 100 is a communications apparatus which is used by a user and receives data from one or more base stations 101. Each of the one or more base stations 101 communicates with two or more terminals 100 located in a cell thereof, and carries out transmission and reception of data. Each Radio Network Controller (RNC) 102 is connected to two or more base stations 101, and has a function of controlling each of the two or more base stations 101. Each RNC 102 is connected to an SGSN (Service GPRS Support Node) 103 which takes charge of packet communications, and relays communications between each of the two or more base stations 101 and the SGSN 103. The SGSN 103 handles authentication about each user, service subscription, routing, mobility management, restrictions on service, context storage, accounting information, etc. A GGSN (GPRS Gateway Support Node) 104 has a function of serving as a gateway to an external network (for example, the Internet) so as to provide a path for packets to be delivered from and to the SGSN 103. In addition to the gateway function, the GGSN 104 carries out processes, such as collection of accounting information, mobility management, Qos (Quality Of Service) negotiation, and a policy control process of adjusting traffic. A service center 105 stores and delivers contents for provision of services, and transmits data about contents to the GGSN 104 according to a user's request. When the multimedia communications system is a W-CDMA system, each terminal 100 is called UE, each base station 101 is called Node-B, and each RNC 102 is called RNC (Radio Network Controller).

Channel

Figure 2:
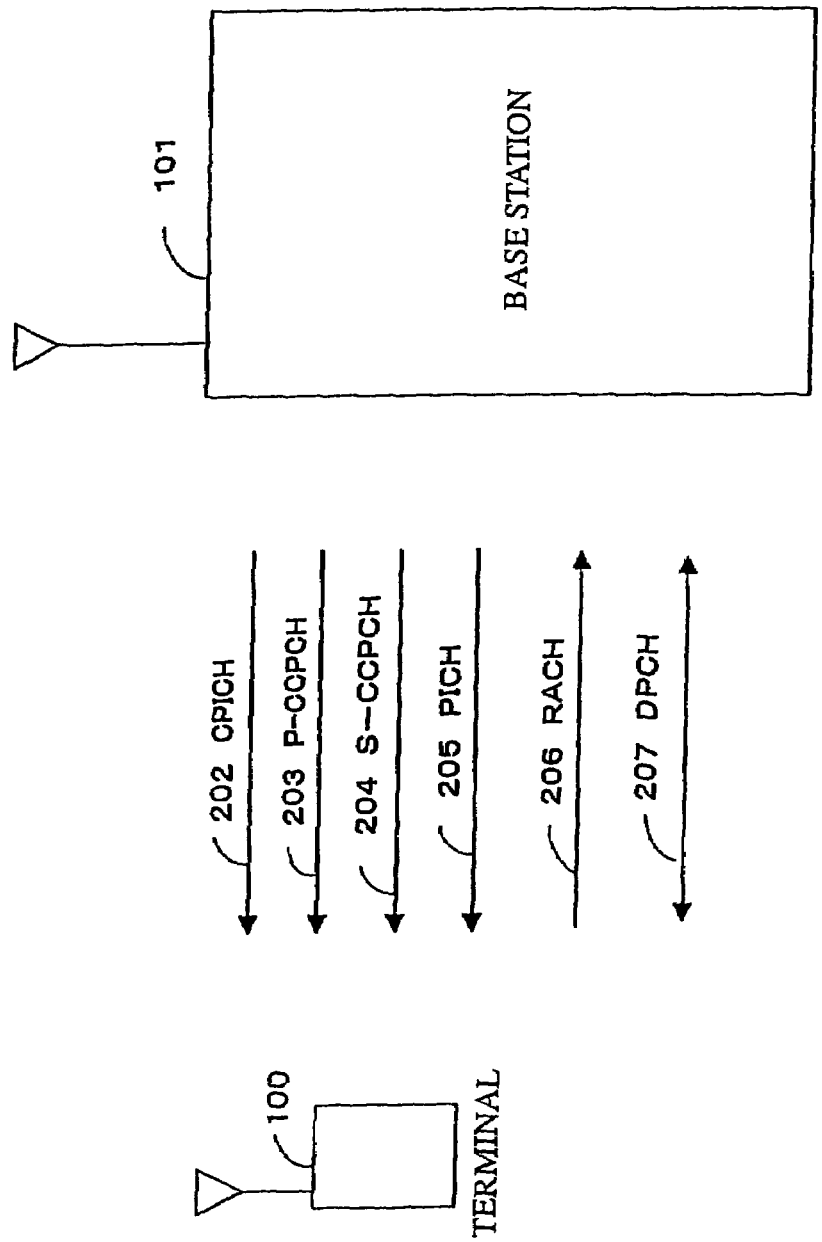
FIG. 2 is a diagram showing the structure of channels in accordance with any one of embodiments 1 to 4 of the present invention.

Next, channels for use with a packet communications service, such as an MBMS, will be explained with reference to FIG. 2.

First, downlink physical channels from each base station 101 to each terminal 100 will be explained. A CPICH (Common Pilot Channel) 202 is a channel used to broadcast a base of all timings to the whole of the cell of each base station. A P-CCPCH (Primary-Common Control Physical Channel) 203 is a channel used to broadcast other broadcast information to each terminal 100. This is used as a BCH (Broadcast Channel) for broadcast information. An S-CCPCH (Secondary-Common Control Physical Channel) 204 which is used to transmit signaling and data to each terminal 100 is provided, and two or more of S-CCPCHs can be provided between each base station and each terminal. A PICH (Paging Indicator Channel) 205 is also prepared for transmission of an indicator for downlink paging.

An RACH (Random Access Channel) 206 is further provided as an uplink common channel from each terminal 100 to each base station 101. A DPCH (Dedicated Physical Channel) 207 is used in both directions as either an uplink channel or a downlink channel, and is independently set up for communications with a specific terminal. This DPCH 207 is used for communications of voice, data (individual data), etc., and signaling by a higher layer. The DPCH 207 includes a DPDCH (Dedicated Physical Data Channel) via which data is transmitted, and a DPCCH (Dedicated Physical Control Channel) via which bits about control are transmitted. Since the DPCH 207 is independently used by each terminal, it is called a dedicated channel. On the other hand, since the other channels are used in common by two or more terminals, they are called common channels.

The above explanation is made by taking, as an example, the structure of the channels in a wireless section between each base station 101 and each terminal 100 in the W-CDMA system, the above-mentioned concept can be applied to other communications system. Any types of channels can be used instead of the above-mentioned channels as long as similar data can be transmitted via the channels. For example, the above-mentioned plurality of channels can be made to share one channel with one another.

Data Distribution Operation

Next, an operation of distributing MBMS data will be explained with reference to FIGS. 1 and 2. Although each terminal 100 can make a request for a service, a case where a contents server delivers data to each terminal will be explained hereafter.

First, a content provider transmits multimedia data (MBMS data) etc. to the service center 105. The service center 105 then stores the multimedia data, and also transfers the multimedia data, by way of the GGSN 104, to the SGSN 103 which manages terminals 100 which can use multimedia services. The SGSN 103 transmits the multimedia data, by way of the plurality of RNCs 102, to the base stations 101, and the plurality of base stations 101 deliver the multimedia data to each of the plurality of terminals using the S-CCPCH channel 204. Each of the plurality of terminals 100 uses the S-CCPCH of any one of the plurality of base stations 101 so as to obtain the multimedia data transmitted from the base station 101. At this time, a terminal 100 which is located on the edge or the like of the cell of a base station and is placed in a not-so-good reception state also receives the multimedia data by way of the S-CCPCH of one or more other base stations 101 and performs selective combining on the multimedia data received via the two or more channels to achieve an improvement in the reception quality of the multimedia data.

Selective Combining Operation

Figure 3:
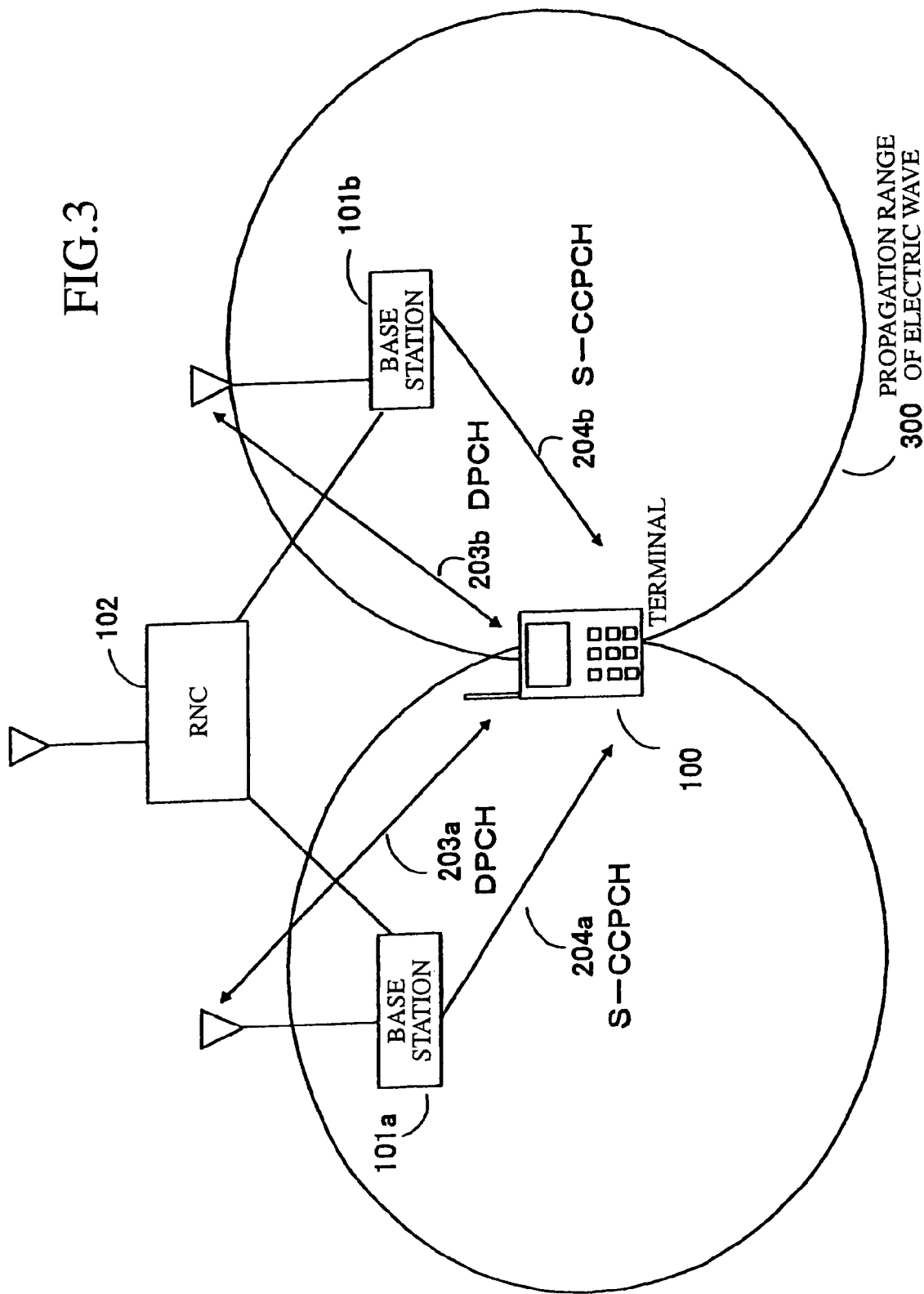
FIG. 3 is an explanatory diagram showing MBMS selective combining in accordance with any one of embodiments 1 to 4 of the present invention.

Next, the selective combining operation will be explained with reference to FIG. 3. Each RNC 102 is usually connected to two or more base stations 101a and 101b, and transmits MBMS data of the same contents to these base stations 101. When a terminal 100 is staying on the edge of a cell (i.e., a cell's edge), the reception quality of the MBMS data may degrade for the reason of the reception power of the terminal becoming weaker if the terminal establishes a radio link with only one of the two or more base stations, for example, the base station 101a. The terminal 100 receives the MBMS data of the same contents via the two or more S-CCPCHs, 204b which are common channels set up from the two or more base stations 101a and 101b. The terminal 100 decodes each received MBMS data so as to select MBMS data with a higher degree of reliability from among two or more decoded MBMS data based on reliability information about each MBMS data, such as a checking result of CRC (Cyclic Redundancy Check). The terminal 100 then uses the selected MBMS data for application processing etc. Thus, even when the terminal 100 is placed in circumstances where it is staying on a cell's edge or the like and the reception quality of MBMS data is bad, the terminal 100 can receive correct MBMS data with a high degree of possibility by carrying out a selective combining operation, and can provide a good reception quality consequently.

Structure of Terminal

Figure 4:
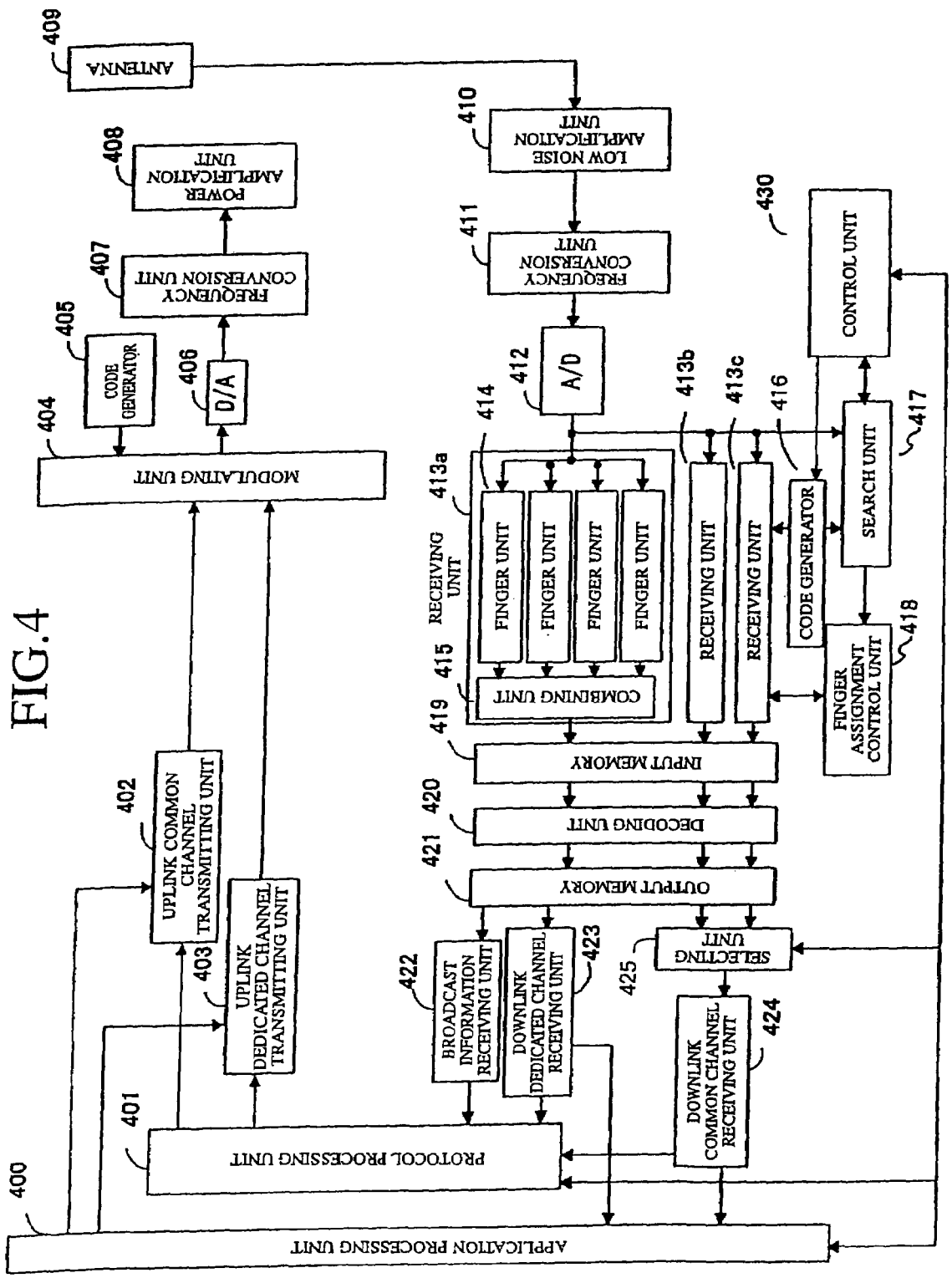
FIG. 4 is a functional block diagram showing a terminal in accordance with any one of embodiments 1 to 4 of the present invention.

Next, the structure of each terminal 100 will be explained in detail with reference to FIG. 4. FIG. 4 shows the structure of each terminal 100 which performs the selective combining on MBMS data. First, an application processing unit 400 carries out transform processing, such as voice codec and image codec, and man machine interface processing, such as key input and screen display, and furnishes data to be transmitted and information such as a request for transmission to an uplink common channel transmitting unit 402 and an uplink dedicated channel transmitting unit 403. A protocol processing unit 401 performs processing associated with communication control, such as a channel setup, a channel release, and hand-over, according to a request or the like from the application processing unit 400. For example, when each terminal 100 carries out a calling process of making a call, the application processing unit 400 receives an input of a telephone number from the user, and makes a request of the protocol processing unit 401 to perform a calling process. In order to transmit required control information, the protocol processing unit 401 controls the uplink common channel transmitting unit 402 and uplink dedicated channel transmitting unit 403 so as to perform a process of establishing a connection with a base station 101 according to a protocol defined by the communications standards. The uplink common channel transmitting unit 402 and uplink dedicated channel transmitting unit 403 perform coding processing, such as turbo coding, and control of transmission timing on data to be transmitted, and output coded data to a modulating unit 404. Using a channelization code and a scrambling code which are generated by a code generator 405, the modulating unit 404 spreads and modulates signals outputted from the uplink common channel transmitting unit 402 and uplink dedicated channel transmitting unit 403. The modulated signals are converted into analog signals by a D/A converter 406, and are also converted into RF (Radio Frequency) signals by a frequency conversion unit 407. A power amplifier 408 then amplifies the converted signals so that they have desired power, and outputs them to an antenna 409. The antenna 409 transmits the amplified signals, as radio signals, to a base station 103.

Next, a process of receiving a radio signal carried out by each terminal 100 will be explained. A weak signal received by the antenna 409 is amplified by a low noise amplifier 410, and is converted into a baseband signal by a frequency conversion unit 411. An A/D converter 412 then converts the analog baseband signal into a digital signal, and outputs the digital signal to both receiving units 413 and a search unit 417.

The search unit 417 performs a cell search and a multi-path detection based on the digital signal, and sends a detected timing to each of the receiving units 413. A finger assignment control unit 418 selects a path which is assumed to be effective from among two or more paths, and assigns it to each of finger units 414. Each of the receiving units 413a, 413b, and 413c have two or more finger units 414 and a combining unit 415, despreads a signal received via each path thereof using a channelization code and a scrambling code outputted from a code generator 416, and rake-combines the despreaded resultant signal so as to receive the signal via a channel assigned to itself. Generally, each of the receiving units includes two or more finger units 414 each of which receives a signal via a path assigned thereto by the finger assignment control unit 418. The combining unit 415 combines the outputs of the plurality of finger units 414 into a signal, and outputs it to an input memory 419.

The operation of the combining unit 413 at the time of selective combining will be explained below. The search unit 417 performs a cell search based on received signals so as to find out two or more cells (i.e., base stations). The code generator 426 then generates a scrambling code corresponding to each of the two or more cells, and a channelization code for a channel via which signals are to be received. Via which channel of which cell each of the plurality of receiving units 413 receives signals is directed by a control unit 430 for controlling the operation of each circuit component of the terminal. The control unit 430 determines whether or not to perform the selective combining based on channel quality information (CQI information) about the quality of uplink/downlink channels of a decoding unit 420, a rate of CRC check error generation, or/and reception power such as a signal power to interference wave received power ratio, (for example, by comparing these values with predetermined thresholds, respectively). When carrying out the selective combining, the control unit 430 controls the code generator 426 so that each of the plurality of receiving units 413 receives MBMS data via an S-CCPCH for MBMS from a different base station. The terminal 100 shown in FIG. 4 has three receiving units 413, and the receiving unit 413a receives control data via an S-CCPCH for control information and the receiving unit 413b receives MBMS data via an S-CCPCH for MBMS, for example. On the other hand, the receiving unit 413c receives the MBMS data via an S-CCPCH for MBMS from another base station 101 for the selective combining. The plurality of receiving units 413 can receive these signals via the channels at independent timings, respectively.

The decoding unit 420 reads the contents of the input memory 419, performs decoding processing, such as CRC checking and turbo decoding, on the contents of the input memory, and writes decoded results in an output memory 421. Generally, since the decoder has a large hardware scale, it is time-shared in many cases. However, when two or more decoders are disposed in the terminal, it is also possible to assign the two or more decoders to a plurality of cells or channels, respectively. The memories 419 and 421 can be independently provided for each of the plurality of receiving units 413. As an alternative, the plurality of receiving units 413 can share one large memory.

After that, required processing is performed for every channel, a broadcast information receiving unit 422 acquires required broadcast information by way of a BCH, and sends it to the protocol control unit 401. When the decoded data is application data, a downlink dedicated channel receiving unit 423 sends the data to the application processing unit 400, whereas when the decoded data is control information, the downlink dedicated channel receiving unit 423 sends the data to the protocol processing unit 401. When needing to carry out the selective combining, a selecting unit 425 reads the data which the plurality of receiving units 413b and 413c have received from the output memory 421, and outputs one of the data which is assumed to be correct to a downlink common channel receiving unit 424 and discards other data based on the CRC checking result obtained by the decoding unit 420. When not performing the selective combining, the selecting unit 425 outputs the data which the receiving units 413b and 413c have received to the downlink common channel receiving unit 424 without discarding them.

Like the downlink dedicated channel receiving unit 423, when the received data is application data, the downlink common channel receiving unit 424 outputs the data to the application processing unit 400, whereas when the received data is control information, the downlink common channel receiving unit 424 outputs the data to the protocol processing unit 401.

The S-CCPCH has S-CCPCH system information (Secondary CCPCH system information) and S-CCPCH information (Secondary CCPCH info), the terminal 100 can acquire information required for demodulation, including a spreading factor about the S-CCPCH, a channelization code, a timing offset, etc., from the S-CCPCH system information and S-CCPCH information. These parameters are received, as control information, by either of the broadcast information receiving unit 422, downlink dedicated channel receiving unit 423, and downlink common channel receiving unit 424, and are stored in the protocol processing unit 401. The protocol processing unit 401 sets these parameters to the plurality of receiving units 413, code generator 416, search unit 417, finger assignment control unit 418, and so on. Since the terminal 100 receives control data via the S-CCPCH for control information only from one active cell, the finger assignment control unit 418 assigns only a multi-path from the one cell to the finger units 414 without combining signals from different cells.

In FIG. 4, although only some signal lines from the control unit 430 to some components are illustrated, the control unit 430 can also control the processing done by each component to which a not-shown signal line is extending. The control unit 430 also observes a signal (i.e., a signal) from a base station which is received by each receiving unit 413, and transmits transmission power control information by which it makes a request to increase or decrease the transmission power to the protocol processing unit 401 according to an observation result. The protocol processing unit 401 then transmits the transmission power control information to the base station 101 using the uplink common channel transmitting unit 402 or uplink dedicated channel transmitting unit 403.

Structure of Base Station

Figure 5:
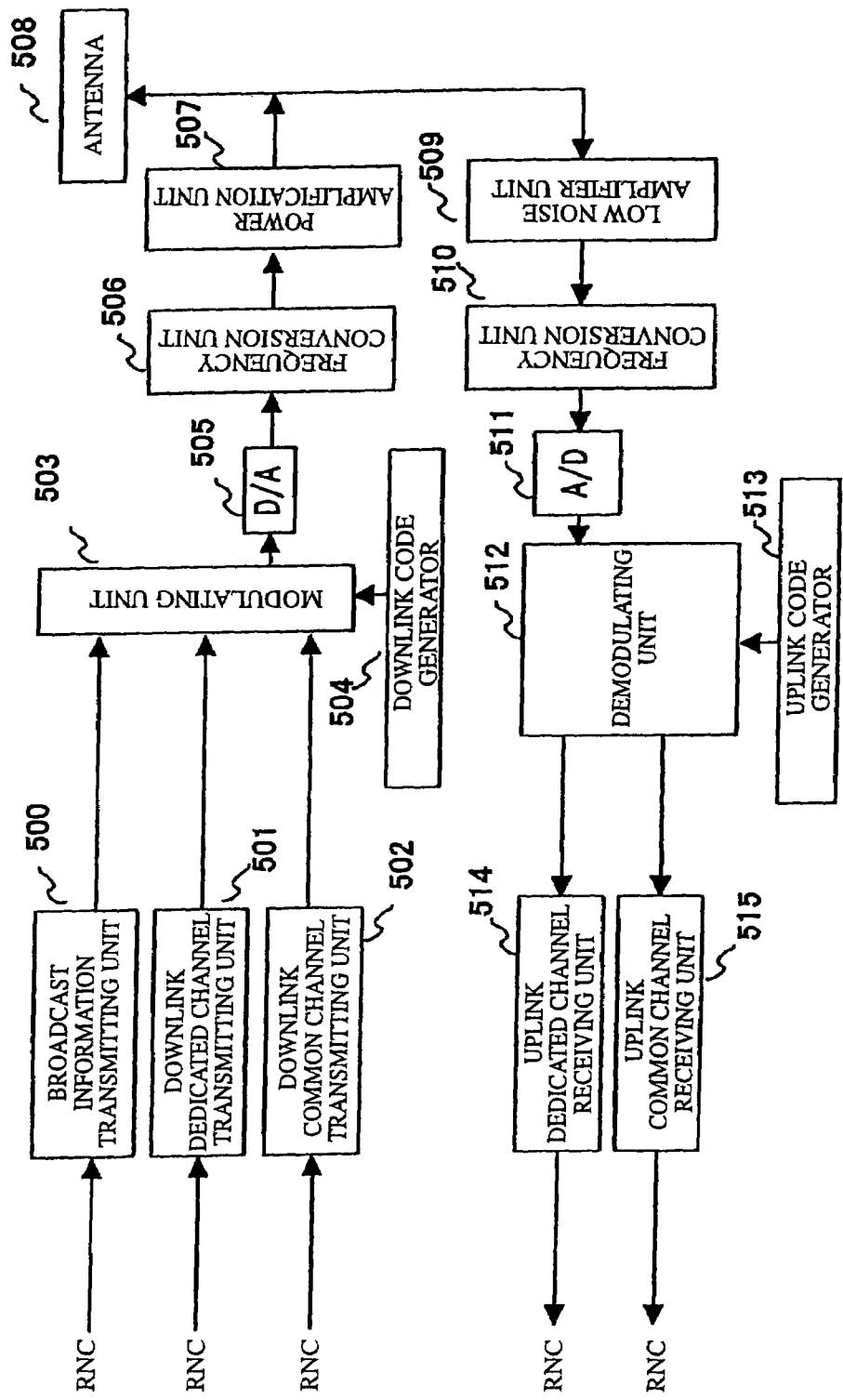
FIG. 5 is a functional block diagram showing abase station in accordance with any one of embodiments 1 to 4 of the present invention.

Next, each base station 101 (Node-B) in accordance with this embodiment 1 will be explained with reference to FIG. 5.

First, a process of transmitting data to a terminal 100 will be explained. Various types of control information and data transmitted from a corresponding Radio Network Controller (RNC) 102 are sent to a plurality of transmitting units 500 to 502 each for transmitting either control information or data associated with a channel, first. The broadcast information transmitting unit 500 performs coding processing on broadcast information which it has received from the RNC 102 so that the broadcast information can be sent out onto a P-CCPCH. The downlink dedicated channel transmitting unit 501 is disposed for every terminal using a dedicated channel, and performs coding processing on control information and data associated with a dedicated channel so that they can be sent out onto a DPCH. Similarly, the downlink common channel transmitting unit 502 encodes control information and multimedia data and then transmits them by sending out them onto an S-CCPCH. The downlink common channel transmitting unit can transmit the coded control information and multimedia data via a single s-CCPCH, or can alternatively transmit them via two or more s-CCPCHs. The data coded by the above-mentioned transmitting units are spread by a modulating unit 503 using a channelization code and a scrambling code for every channel and are then outputted to a D/A converter 505. The channelization code and scrambling code are generated by a downlink code generator 504. The D/A converter 505 converts an input digital signal into an analog signal, and a frequency conversion unit 506 further converts the converted analog signal into an RF (Radio Frequency) signal. The RF signal is amplified so as to have desired power by a power amplifier 507, and is transmitted via an antenna 508. At this time, the power amplifier 507 controls its amplification degree based on transmission power control information received from terminals 100.

Next, a process of receiving signals from terminals 100 will be explained. Weak signals from terminals 100 which the antenna 508 has received are amplified by a low noise amplifier 509. A frequency conversion unit 510 then converts the amplified signals into a baseband signal, and an A/D converter 511 converts the baseband signal into a digital signal. A demodulating unit 512 divides the digital signal into signals from the terminals 100 using scrambling codes generated by an uplink code generator 513, and divides the signal from each of the terminals 100 into channel signals using channelization codes. A signal associated with a dedicated channel and included in the signals demodulated by the demodulating unit 512 are channel-decoded (decoded) by an uplink dedicated channel receiving unit 514, and is then sent to the RNC 102, and a signal associated with a common channel of the signals demodulated by the demodulating unit 512 is channel-decoded (decoded) by an uplink common channel receiving unit 515 and is sent to the RNC 102.

Radio Network Controller (RNC)

Figure 6:
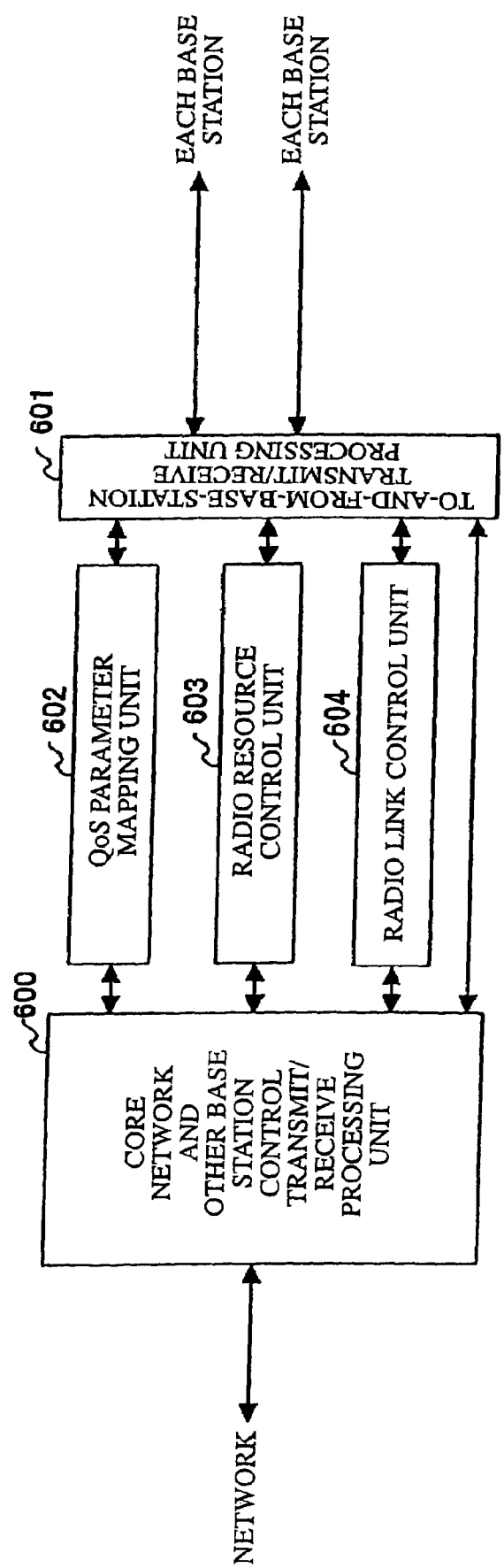
FIG. 6 is a functional block diagram showing a Radio Network Controller (RNC) controller in accordance with any one of embodiments 1 to 4 of the present invention.

Next, the structure of each RNC 102 will be explained with reference to FIG. 6. Each RNC 102 relays between core network processing and radio channels to base stations 101, and has a main function of managing radio resources and providing an instruction for setting up or releasing a channel to a base station 101. A transmit/receive processing unit 600 is connected to the core network and other RNCs, and carries out the core network processing, such as RANAP (Radio Access Network Application Part), and communications protocol processing for other RNCs, such as RNSAP (Radio Network Subsystem Application Part). A to-and-from-base-station transmit/receive processing unit 601 performs communications protocol processing for communications with base stations 101, such as NBAP (Node B Application Part). A Qos parameter mapping unit 602 obtains parameters for radio channels which satisfy requirements based on a Qos (Quality of Service) instruction from the core network. A radio resource control unit 603 performs processing about radio resources, and performs control processing on terminals 100 and notifies the parameters to the terminals 100 through RRC signaling. A radio-link control unit 604 performs buffering in a radio link and resending control.

The sharing of the functionality of each RNC among those components is based on the difference among their logical functions, and these logical functions are not necessarily separated clearly when they are actually implemented via hardware or software.

Control of Connection Based on Notification of UE Capabilities

Next, connection control in accordance with this embodiment 1 using the above-mentioned communications system will be explained.

There is a possibility that selective combining of S-CCPCHs for MBMS and reception of DPCH occur simultaneously when a request for connection using a dedicated channel is issued to a terminal by the network side while the terminal is using MBMS, for example. In this case, the terminal 100 needs to receive control data via an S-CCPCH for control and to receive MBMS data via at least two S-CCPCHs for MBMS in order to perform MBMS selective combining. In addition, the terminal 100 needs to receive data via a DPCH. That is, the terminal 100 needs at least four receiving units 413 so as to receive data via a total of at least four channels. However, the provision of such many receiving units 413 in the terminal 100 results in increase in the size of the hardware. Since the terminal thus needs to have needless receiving units 413 with little frequency in use, it is inefficient. On the other hand, the terminal can give up the selective combining, only the receiving unit 413b of the two receiving units 413b and 413c which are used for the selective combining can receive MBMS data via an S-CCPCH for MBMS, and the other receiver 413c can receive data via a DPCH. A problem with this case is however that a bad influence is exerted upon the total capacity of the whole of the system. That is, each base station 101 is always controlling its transmission power in order to keep the reception quality of each terminal 100 good. When the reception quality degrades in each terminal 100, the corresponding base station 101 raises its transmission power so as to improve the reception quality of each terminal. A problem is however that when transmitting data, such as MBMS data, to two or more terminals 100 via a common channel, these terminals 100 have various receiving qualities and some terminals 101 having a bad reception quality always exist. When a terminal 100 which is located in a cell's edge, as mentioned above, gives up the selective combining, and continues receiving data by using only an S-CCPCH for MBMS from one base station 101, the base station 101 cannot but raise its transmission power because the reception quality of the terminal 100 worsens compared with a case where it does not carry out the selective combining. As a result, since the power assigned to other terminals 100 decreases, the capacity of the base station 101 cannot but become less. To solve this problem, the communications system in accordance with this embodiment 1 performs connection control so that any link for a dedicated channel cannot be set up while a terminal 100 in question is carrying out the selective combining for MBMS, thereby preventing the capacity of the whole of the system from reducing. Furthermore, the level of hardware requirements for each terminal 100 can be also lowered.

Hereafter, a sequence when communications via a dedicated channel occurs while the selective combining for MBMS is carried out will be explained with reference to FIG. 7. As an example, a case where a terminal determines whether or not to set up a dedicated channel according to UE Capabilities when receiving an incoming call by voice while using MBMS will be explained.

A terminal 100 transmits reception capability information about its reception capability when carrying out the selective combining for MBMS, as UE Capabilities, to a base station 101 (in step ST100). The terminal 100 reads the reception capability information which is preset according to the capacity of the receiving units thereof from the internal memory, and transmits it to a base station using either a common channel or a dedicated channel. As the reception capability information, any one of various types of information, including a concrete value, such as the number of channels, a value of Yes/No which indicates whether the terminal can perform simultaneous reception of data via an S-CCPCH and a DPCH while performing the selective combining, etc. can be used. An example is shown in FIG. 8. FIG. 8 shows an example of the reception capability information in a case where an MBMS selective combining function is available as an option for the requirements of each terminal 100. Each terminal 100 is classified into one of seven classes according to the communication speed thereof. "Maximum number of S-CCPCH radio links for MBMS selective combining" indicates the maximum number of additional S-CCPCH radio links which can be used for the selective combining for MBMS. A terminal 100 having this variable which is equal to or larger than 1 supports the selective combining (if "Maximum number of S-CCPCH radio links for MBMS selective combining" is not the maximum number of additional S-CCPCH radio links which can be used for the selective combining for MBMS, but indicates the total number of S-CCPCHs including an existing S-CCPCH, a terminal 100 having the variable which is equal to or larger than 2 supports the selective combining). "Simultaneous reception of SCCPCH and DPCH during MBMS selective combining" is a parameter indicating whether or not reception of data via a dedicated channel (DPCH) is possible during the MBMS selective combining. The parameter=No means that reception of data via a dedicated channel is impossible, the parameter=Yes/No means that reception of data via a dedicated channel can be enabled or disabled, and the parameter=Yes means that reception of data via a dedicated channel is always possible. A terminal 100 which supports the selective combining with this parameter can specify whether or not to carry out simultaneous reception of data via a dedicated channel during the selective combining. When a terminal cannot perform reception of data via a dedicated channel (DPCH) during the selective combining, "Priority of DPCH to MBMS selective combining" can be also defined as an optional parameter indicating which service the user desires to receive using the terminal. When this parameter is set, the terminal can carry out not only judgment of whether or not to carry out simultaneous use of services but give a higher priority to either one of contending services according to the terminal's intention. That is, the terminal can determine whether or not to stop a service under communications and then give a higher priority to another service according to the terminal's intention. Assignment of priorities to various services can be determined according to the user's intention rather than the performance of the terminal, and can be determined with signaling other than the UE Capabilities parameter. All of the three above-mentioned parameters do not need to be used simultaneously, and only a parameter required for below-mentioned determination processing should be transmitted to a base station.

The terminal 100 transmits a number indicating a class to which it belongs or directly transmits parameters set thereto, as shown in FIG. 8, to a base station 101 so that the parameters can be notified to the base station 101. When receiving the information about the UE Capabilities (i.e., the reception capability information) (in step ST101), the base station 101 transmits the information to a corresponding RNC 102, and this RNC 102 receives and stores the information therein (in step ST102).

After completing the above-mentioned notification processing, the terminal 100 receives MBMS data from two or more base stations 101 and starts the MBMS selective combining (in step ST103). At this time, the terminal 100 notifies status information indicating the status of the MBMS selective combining to a base station 101 (in step ST104). To be more specific, the terminal 100 transmits either the number of channels of S-CCPCHs which the terminal 100 is actually using for the selective combining or information indicating whether or not the terminal 100 is carrying out the selective combining to a base station 101.

When receiving the status information indicating the status of the MBMS selective combining from the terminal 100 (in step ST105), the base station 101 relays the information to a corresponding RNC 102. The RNC 102 then stores the received status information in a memory or the like thereof (in step ST106).

On the other hand, when an incoming call signal is transmitted, as a connection request, from the core network to the RNC 102 (in step ST107), the RNC 102 determines whether or not to allow the base station to set up a dedicated channel based on the above-mentioned reception capability information and status information indicating the status of the MBMS selective combining (in step ST108). Although the details of this step will be mentioned later, the RNC 102 stores the reception capability information and status information indicating the status of the MBMS selective combining for every terminal 100, and compares the received reception capability information and status information with corresponding references according to which terminal 100 is associated with the connection request so as to determine whether or not to allow a base station to establish a connection with the terminal 100. When not allowing assignment of a dedicated channel to the incoming call signal, the RNC 102 refuses the incoming call and notifies the refusal to the core network (in step ST109). On the other hand, when allowing assignment of a dedicated channel to the incoming call signal, the RNC 102 answers the incoming call signal and performs signaling for starting a DPCH (i.e., a dedicated channel) to a base station device 101 (in step ST110). The base station device 101 then starts a dedicated channel (in step ST111). Finally, the terminal 100 starts the dedicated channel in response to the base station 101, and starts communications using the DPCH.

The determination processing in above-mentioned step ST108 is done as follows. FIG. 9 shows the determination processing carried out by the RNC 102 during the selective combining. First, the RNC 102 receives UE Capabilities (i.e., reception capability information) (in step ST200). The RNC 102 then checks the parameter indicating whether or not reception of data via a DPCH is possible during the selective combining ("Simultaneous reception of SCCPCH and DPCH during MBMS selective combining") based on the received UE Capabilities so as to determine whether or not to allow the base station to set up a dedicated channel during the MBMS selective combining according to this parameter (in step ST201). When not allowing the base station to set up a dedicated channel during the MBMS selective combining (when "No"), the RNC 102 notifies a refusal of assignment of a dedicated channel to the core network (in step ST202). On the other hand, when allowing the base station to set up a dedicated channel during the MBMS selective combining (when "Yes"), the RNC 102 instructs the base station 101 to set up a dedicated channel (in step ST203).

Although the base station 101 controls the transmission power of the S-CCPCH for MBMS based on either the reception quality of the terminal 100 or a power distribution balance between the S-CCPCH for MBMS and other channels, the terminal 100 can maintain the selective combining and can maintain its good reception quality since the setup of the dedicated channel is appropriately controlled by the RNC 102. Therefore, the transmission power of the S-CCPCH used for the transmission of MBMS data by the base station 101 can be reduced to relatively low.

As mentioned above, the communications system in accordance with this embodiment 1 can set up a dedicated channel between a base station and a terminal 100 which is carrying out the selective combining in accordance with the reception capability of the terminal 100 when a request for connection with the terminal is made. Therefore, when the terminal 100 has a bad reception quality and therefore needs to carry out the selective combining in order to receive MBMS, e.g., when the terminal 100 is staying in the vicinity of a cell's edge, the communications system can suppress an extreme increase in the transmission power due to a connection via a dedicated channel, and therefore can provide MBMS to the terminal with little transmission power. Therefore, the communications system can suppress too large a strain on other communications services, and can therefore suppress reduction of the capacity of the whole of the communications system effectively. Any terminal for use in the communications system does not need to be provided with large-scale hardware which makes it possible to receive MBMS simultaneously via a common channel and data via a dedicated channel. Therefore, in accordance with the present embodiment, there is provided a terminal having a reduced amount of hardware for reception during the selective combining, which can receive multimedia services which fit the user's needs with the small-scale hardware.

Embodiment 2

Next, an example of controlling setup of a dedicated channel (DPCH) based on the maximum number of signals used for selective combining by a terminal 100 will be explained. Since the basic operation of a communications system of this embodiment is the same as that of embodiment 1, the difference between this embodiment and embodiment 1 will be explained hereafter.

Figure 7:
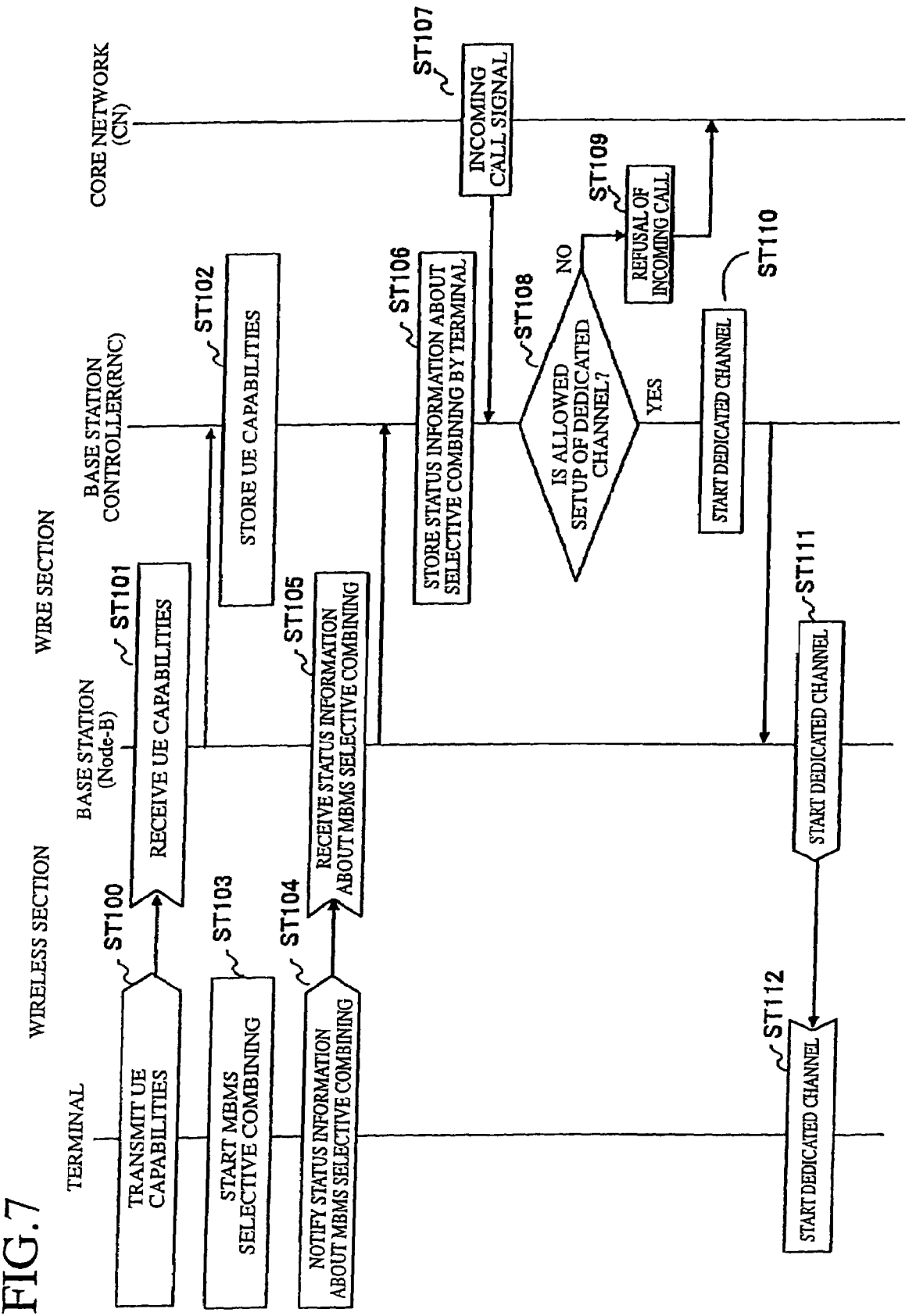
FIG. 7 is a sequence diagram showing processing which is carried out when communications using a dedicated channel occurs during MBMS selective combining in the system in accordance with embodiment 1 of the present invention.

FIG. 10 is a flow chart for explaining determination processing carried out by each RNC 102, and shows details of step ST108 of FIG. 7.

First, each RNC 102 reads the number m of signals used for MBMS selective combining by each terminal 100, which is received in step ST106 of FIG. 7, from a memory thereof (in step ST300). Each RNC 102 also reads the maximum number n ("Maximum number of S-CCPCH radio links for MBMS selective combining") of S-CCPCH radio links which can be received for the MBMS selective combining from reception capability information about the reception capability of each terminal which is received in step ST102 of FIG. 7 and is stored in the memory (n is a value equal to the maximum number of additional S-CCPCHs+1). Each RNC 102 then calculates the number (n−m) of remaining receiving units which each terminal 100 can use (in step ST302) so as to determine whether or not to allow setup of a new dedicated channel (DPCH) during the selective combining (in step ST303). That is, in a case of n−m>0, each RNC 102 determines that it is possible for terminal 100 to receive data via a new dedicated channel and allows setup of a dedicated channel. Then, when not allowing setup of a dedicated channel, the RNC 102 notifies a refusal of assignment of a dedicated channel to the core network (in step ST304), whereas when allowing setup of a dedicated channel, the RNC 102 instructs a base station to set up a dedicated channel (in step ST305), like that in accordance with embodiment 1.

The above-mentioned determination processing can be used when all terminals 100 can carry out the MBMS selective combining. Therefore, unlike embodiment 1, there is no necessity to make a distinction between terminals which can carry out the MBMS selective combining and terminals which cannot carry out the MBMS selective combining.

In accordance with above-mentioned embodiment 2, the number of S-CCPCH radio links which can be received by each terminal during the selective combining is used as the reception capability information about the reception capability of each terminal. Each RNC can alternatively determine whether or not to allow establishment of a connection via a dedicated channel based on the number (Maximum number of simultaneous S-CCPCH radio links) of S-CCPCH radio links which can be received by each terminal at times other than the time of selective combining. That is, each terminal can transmit the number m of S-CCPCH radio links which are being currently received thereby to a RNC via a base station so that the RNC can compare the number m of S-CCPCH radio links which are being currently received by each terminal with the number n of S-CCPCH radio links which can be received by each terminal so as to determine whether or not each terminal 100 can afford to receive data via a dedicated channel.

Embodiment 3

Next, an embodiment of determining whether or not to allow a terminal to carry out communications via a dedicated channel during MBMS selective combining based on UE Capabilities, the number of S-CCPCH radio links which are being currently used for the selective combining, and the speed of a dedicated channel will be explained. Since the basic operation of a communications system of this embodiment is the same as that of embodiment 2, the difference between this embodiment and embodiment 2 will be explained hereafter.

A terminal 100 may not use all receiving units 413 thereof depending on circumstances even if it is carrying out selective combining. However, even in such a case, since it is far beyond the capability of the decoder of the terminal to carry out decode processing required for reception of data via a dedicated channel if the dedicated channel has a high speed, a certain limit is imposed on the speed of the dedicated channel.

In FIG. 11, the same reference symbols as shown in FIG. 10 denote the same processes as those of FIG. 10 or like processes. Therefore, processes of steps ST300 to ST303 are the same as those of FIG. 10. When, in step ST303, allowing communications via a dedicated channel (DPCH), a Radio Network Controller (RNC) 102 then checks the speed of the dedicated channel so as to determine whether or not the speed is equal to or smaller than a fixed threshold (for example, 64 kbps) (in step ST400). The fixed threshold can be an arbitrary fixed value, and can be alternatively a value received from a terminal 100, as a UE Capabilities parameter. As an alternative, the fixed threshold can be a threshold which is preset based on the number m of signals which are used for the MBMS selective combining, the number m being read in step ST300 (for example, a threshold which varies in inverse proportion to m). Then, when allowing communications via a dedicated channel, the RNC 102 shifts to step ST305, whereas when not allowing communications via a dedicated channel, the RNC 102 shifts to step ST306.

The communications system in accordance with this embodiment 3 can thus adjust the rate of data which are transmitted to each terminal 100 according to the decoding capability or the like of the decoder of each terminal 100, thereby suppressing overflow in each terminal 100

Embodiment 4

Next, an embodiment of determining whether or not to allow each terminal to carry out communications via a dedicated channel during MBMS selective combining based on UE Capabilities selected by the user. Since the basic operation of a communications system of this embodiment is the same as that of embodiment 1, the difference between this embodiment and embodiment 1 will be explained hereafter.

A communications system in accordance with this embodiment allows each terminal to refuse an incoming call by voice according to the user's selection while utilizing MBMS, for example. On the contrary, the communications system in accordance with this embodiment controls each terminal so that each terminal can handle an incoming call by voice even if it is utilizing MBMS without reducing the service quality of MBMS.

Figure 12:
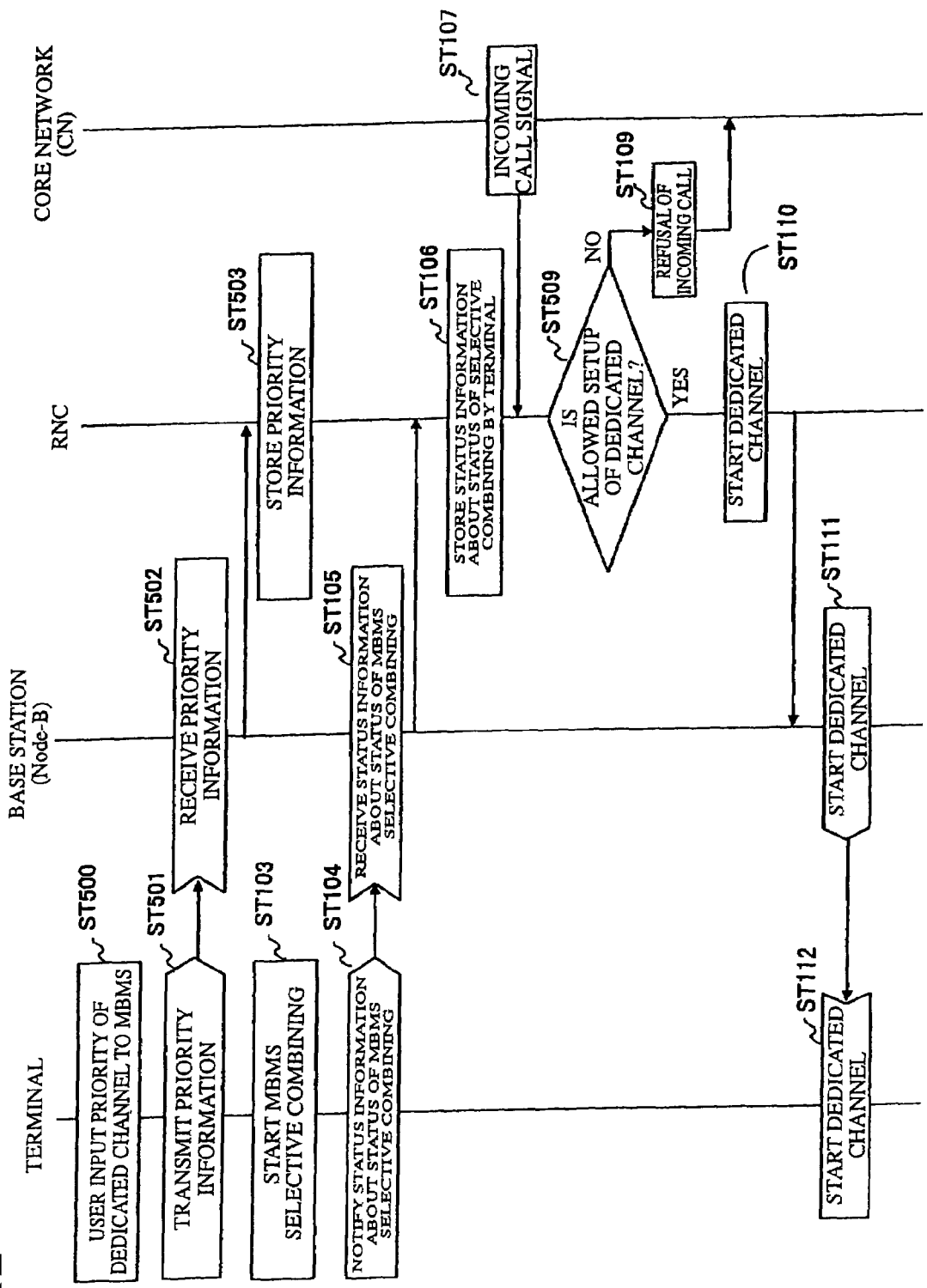
FIG. 12 is a sequence diagram showing processing which is carried out when communications via a dedicated channel occur during MBMS selective combining in the system in accordance with embodiment 4 of the present invention.

FIG. 12 shows a sequence of the communications system in accordance with this embodiment 4. In FIG. 12, the same reference symbols as shown in FIG. 7 of embodiment 1 denote the same processes as those of FIG. 7 or like processes. When the user inputs priority of dedicated channel to MBMS into the terminal 100, an application processing unit 400 of the terminal 100 receives a value set by the user (i.e., a parameter "Priority of DPCH to MBMS Selective Combining" of FIG. 8) (in step ST500). The terminal 100 then transmits the received set value to a base station 101, as a part of UE Capabilities parameters (in step ST501). The base station 101 receives the parameter indicating the priority of dedicated channel to MBMS, which is selected by the user, and transmits the parameter to a corresponding Radio Network Controller (RNC) 102 (in step ST502). The RNC 102 then stores the parameter indicating the priority of dedicated channel to MBMS, which is selected by the user, therein (in step ST503).

The stored parameter indicating the priority is used for determination of whether or not to allow setup of a dedicated channel (DPCH) in performing the process of step ST509. That is, when the parameter indicates that a higher priority is assigned to communications via a dedicated channel (DPCH), the RNC 102 advances to step ST110 in which it instructs the base station 101 to set up a dedicated channel even if the terminal 100 is carrying out the selective combining. When a dedicated channel is then set up by the base station 101, the terminal 100 interrupts the process of receiving the MBMS data, or stops the selective combining, and then performs a process of assigning one receiving unit 413 to the dedicated channel. On the other hand, when the parameter indicates that a higher priority is not assigned to communications via a dedicated channel, the RNC 102 does not allow communications via any dedicated channel (in step ST109).

It cannot be overemphasized that the criterion of judgment in accordance with either of above-mentioned embodiments 1 to 3 and the above-mentioned priority of dedicated channel to MBMS can be combined. For example, in step ST509, the RNC can determine which one of reception of S-CCPCH and reception of DPCH a terminal, which is not allowed to carry out simultaneous reception of S-CCPCH for MBMS and DPCH, should carry out based on the priority of S-CCPCH to DPCH, like that in accordance with embodiment 1. Like those in accordance with embodiments 2 and 3, when determining that a terminal cannot perform simultaneous reception of S-CCPCH for MBMS and DPCH according to a criterion of judgment, the RNC 102 can determine which one of reception of S-CCPCH and reception of DPCH the terminal should carry out based on the priority of S-CCPCH to DPCH.

As mentioned above, the communications system in accordance with this embodiment 4 can allow each terminal to determine whether to continue selective combining or to give a higher priority to setup of a dedicated channel according to the user's intention, and can provide multimedia services which fit the user's needs for the user. Therefore, each terminal can respond to an incoming call by voice or the like while utilizing MBMS.

The parameter indicating whether or not to give a higher priority to setup of a dedicated channel does not necessarily need to be transmitted as UE Capabilities. The parameter can be alternatively transmitted using other signaling.

The determination processings in accordance with embodiments 1 to 4 can be combined.

The processing shown in the flow chart in accordance with any one of above-mentioned embodiments can be implemented via a special-purpose integrated circuit. As an alternative, the processing can be implemented via a combination of a general-purpose processor (such as a DSP) and software.

The software program can be recorded in a recording medium which computers can read. As an alternative, the software program can be downloaded via communications by radio or cable.

Since each of the channels explained in above-mentioned embodiments is also applicable to a similar control channel or data transmission channel, the names of those channels are not limited to above-mentioned ones. The structure of the communications system as shown in FIGS. 4 to 6 can be also implemented by using the circuitry of widely diffused radio communication equipment or other hardware as a basis and modifying the functionality of the circuitry or other hardware. Especially, the structure of the communications system can be implemented by combining a general-purpose processor (such as a DSP) and software without having to use a special-purpose circuit for every functional block.

In addition, from viewpoint of reduction of hardware in the receiving units of each terminal, control of reception capability information or setup of a dedicated channel during selective combining in accordance with above-mentioned embodiments is effective even when each base station does not perform power control for MBMS positively according to the reception quality of each terminal.

In accordance with the present invention, MBMS data is not limited to multimedia data, and can be any type of data as long as it is of broadcast or multicast type. Multicast type of data means data to be transmitted only to a specific group (two or more users) such as a group which joins a specific service.

The structures of the components of the communications system in accordance with the present invention are not limited to those in accordance with either of above-mentioned embodiments. The present invention can be applied to any future communications technology, such as the contents of specifications associated with 3GPP MBMS which will be defined from now on, without departing from the spirit of the present invention.

As mentioned above, the communications system in accordance with the present invention can control a new setup of a dedicated channel for a terminal 100 appropriately when the terminal 100 is carrying out selective combining for MBMS, thereby improving the capacity of the whole of the system.

INDUSTRIAL APPLICABILITY

The present invention can be applied to a radio communications system in which each terminal can receive data via two or more data channels.

The invention claimed is:

1. A communication method which is executed by a Multimedia Broadcast Multicast Service (MBMS) system which broadcasts multimedia data from at least one base station to communications terminals using at least one common channel which is used for the multimedia data transmission, comprising:
   receiving the multimedia data transmitted via the at least one common channel from the at least one base station;
   receiving dedicated data transmitted via a dedicated channel set up for a specific communications terminal;
   carrying out a selective combining operation to select the multimedia data from among two or more sets of multimedia data when the sets of multimedia data transmitted via two or more common channels are received in the multimedia data receiving step; and
   signaling to a core network to stop the reception of the dedicated data via the dedicated channel when the terminal is not able to perform simultaneously the reception of the multimedia data by the multimedia data receiving step and the reception of the dedicated data by the dedicated data receiving step during the selective combining operation.

2. A communication system applicable to a Multimedia Broadcast Multicast Service (MBMS) system in which at least one base station broadcasts a multimedia data using at least one common channel which is used for the multimedia data transmission, the communication system comprising:
   a communications terminal including:
   a plurality of receiving units configured to receive the multimedia data transmitted via the at least one common channel from the at least one base station and to receive dedicated data transmitted via a dedicated channel set up for a specific communications terminal;
   a selective combining unit configured to carry out a selective combining operation to select the multimedia data from among two or more sets of multimedia data when the sets of multimedia data transmitted via two or more common channels are received in the receiving units; and
   a transmitting unit configured to transmit signaling to a core network to stop receiving the dedicated data via the dedicated channel when the communications terminal is not able to receive the multimedia data and the dedicated data simultaneously during the selective combining operation.

* * * * *